(12) United States Patent
Doll

(10) Patent No.: US 7,694,772 B1
(45) Date of Patent: Apr. 13, 2010

(54) FORWARD CAB ARTICULATED TRACTOR

(75) Inventor: Robert A. Doll, Malone, WI (US)

(73) Assignee: M-B Companies Inc., New Holstein, WI (US)

( * ) Notice: Subject to any disclaimer, the term of this patent is extended or adjusted under 35 U.S.C. 154(b) by 52 days.

(21) Appl. No.: 12/157,952

(22) Filed: Jun. 16, 2008

Related U.S. Application Data

(60) Provisional application No. 60/963,187, filed on Aug. 3, 2007.

(51) Int. Cl.
*B62D 5/06* (2006.01)
*B62D 53/00* (2006.01)

(52) U.S. Cl. ........................... 180/235; 180/418
(58) Field of Classification Search .............. 180/235, 180/6.64, 418, 419
See application file for complete search history.

(56) References Cited

U.S. PATENT DOCUMENTS

| | | | | |
|---|---|---|---|---|
| 3,397,752 A | * | 8/1968 | Salna | 180/235 |
| 3,805,908 A | * | 4/1974 | Thompson | 180/235 |
| 3,921,836 A | * | 11/1975 | Wyslouch et al. | 414/719 |
| 3,995,569 A | * | 12/1976 | Picardat | 111/12 |
| 4,062,420 A | * | 12/1977 | Stedman | 180/89.1 |
| 4,173,352 A | | 11/1979 | Van Der Lely | |
| 4,310,062 A | | 1/1982 | Link et al. | |
| 4,424,878 A | * | 1/1984 | van der Lely | 180/235 |
| 4,512,433 A | * | 4/1985 | van der Lely | 180/235 |
| 4,754,815 A | * | 7/1988 | Brouwer et al. | 172/2 |
| 4,809,805 A | | 3/1989 | Short | |
| 5,332,247 A | | 7/1994 | Etherington | |
| 5,562,175 A | * | 10/1996 | Bjorsne et al. | 180/419 |
| 6,508,328 B1 | | 1/2003 | Kenyon et al. | |
| 6,688,419 B2 | | 2/2004 | Erikson et al. | |
| 6,699,024 B2 | | 3/2004 | Dong | |
| 6,732,828 B1 | | 5/2004 | Abend et al. | |

* cited by examiner

*Primary Examiner*—Lesley Morris
*Assistant Examiner*—Marc A Scharich
(74) *Attorney, Agent, or Firm*—Robert T. Johnson

(57) ABSTRACT

This invention of a "FORWARD CAB ARTICULATED TRACTOR" comprises a front cab section and an articulating joint attached to the rear of the front cab section and a rear section attached to the rear of the articulated joint with the front of the rear section attached to the rear section of the articulated joint and a gas driven internal combustion engine mounted in the rear section of the forward cab articulated tractor, and the gas driven engine connected to drive a hydraulic fluid pump to provide hydraulic fluid to a manifold and the manifold to supply hydraulic fluid to lines connected to disc brakes and to steer the forward cab articulated tractor by activating hydraulic fluid from the manifold to cylinders attached to the articulated joint and to the rear of front cab section. The front wheels are provided with brakes activated by hydraulic fluid from the manifold and the brakes are further activated by a spring loaded cylinder which is activated by shut off of hydraulic fluid from the manifold.

1 Claim, 11 Drawing Sheets

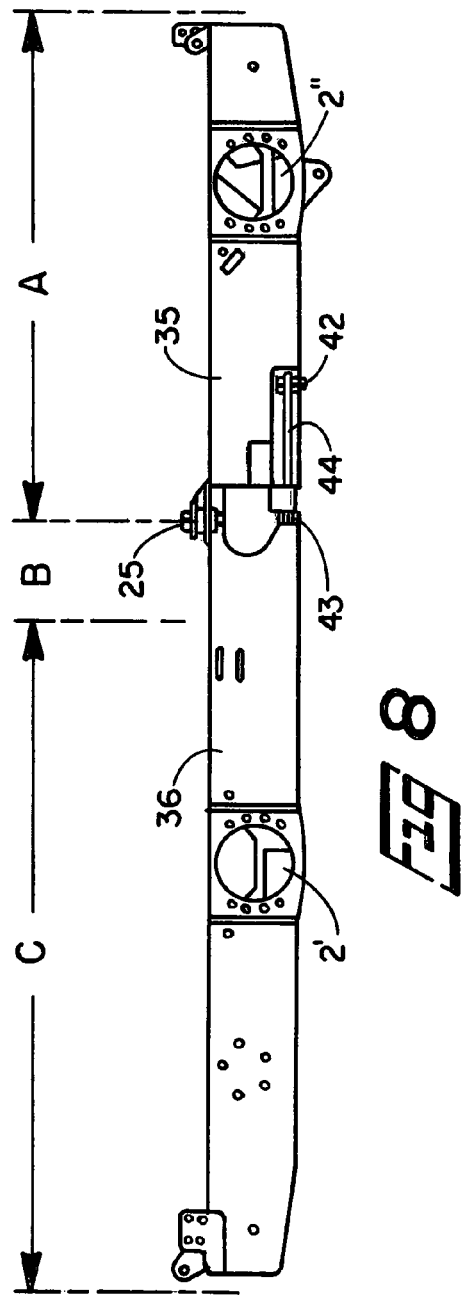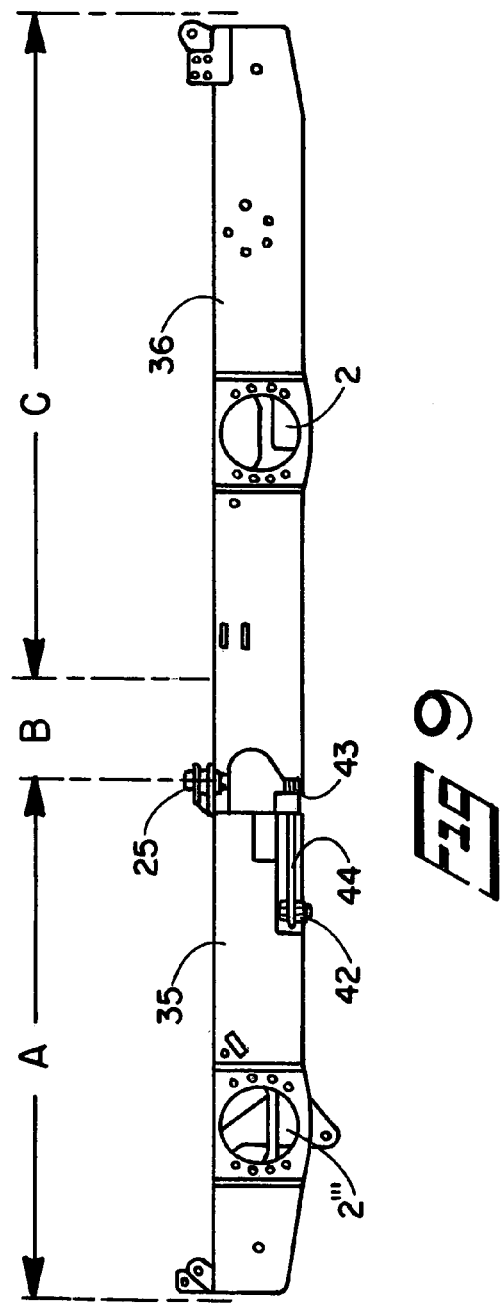

FORWARD CAB ARTICULATED TRACTOR

CROSS REFERENCE TO RELATED APPLICATION

Figure 1:
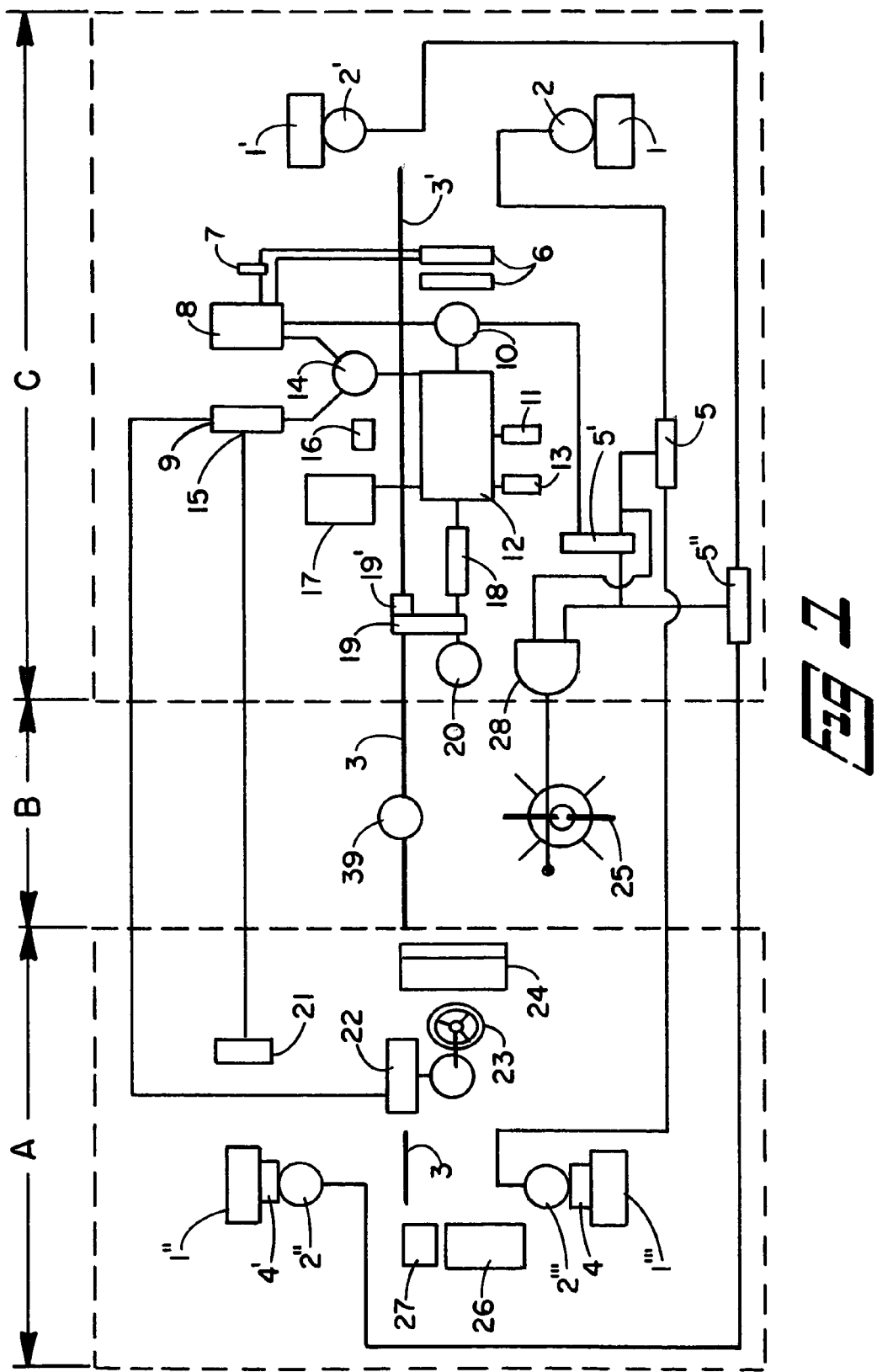

This application claims the benefit of priority to U.S. provisional application No. 60/963,187, filed Aug. 3, 2007, which is hereby incorporated by reference in its entirety.

BACKGROUND OF THE INVENTION

Turn around of the conventional tractor leaves much to be desired, concerning the turn around diameter. The turn around diameter can be greatly reduced by an articulated tractor having an articulated joint joining a forward or front cab section to a rear motor section and the articulated joint including a king pin and auxiliary pin in the articulate joint apparatus, and hydraulic steering, with hydraulic motors driving each wheel and a turn angle limit of the articulating joint between the front cab section and the rear motor section.

SUMMARY OF THE INVENTION

This invention includes a new forward cab articulated tractor and articulate hinge apparatus having a kingpin and auxiliary pins in the articulate hinge apparatus of the forward cab articulated tractor, and further the articulated tractor includes an engine to drive a hydraulic pump to pump hydraulic fluid into a manifold for hydraulic steering, brakes and hydraulic motors driving each wheel, plus other attachments requiring fluid from the hydraulic manifold for operation.

PRIOR ART

The following is a list of U.S. patents showing prior art.
- U.S. Pat. No. 4,173,352 for ARTICULATED TRACTOR AND TOW CAR.
- U.S. Pat. No. 4,310,062 for HYDROSTATIC STEERING.
- U.S. Pat. No. 4,809,805 for ARTICULATED VEHICLE.
- U.S. Pat. No. 5,332,247 for ARTICULATED JOINT
- U.S. Pat. No. 6,508,328 for ALL WHEEL DRIVE HYDRAULIC TRANSMISSION.
- U.S. Pat. No. 6,688,419 for HYDRAULIC DRIVING SYSTEM.
- U.S. Pat. No. 6,699,024 for HYDRAULIC MOTOR.
- U.S. Pat. No. 6,732,828 for HYDRAULIC DRIVEN VEHICLE AND HYDRAULIC MOTOR ON TRANSAXLE None of the prior art patent references individually would anticipate, or collectively would make obvious this present invention

OBJECTS OF THE INVENTION

An object of this invention is to disclose an articulate joint with a king pin and an auxiliary pin in a forward cab articulated tractor Another object is to disclose hydraulic driven motors at each wheel and each wheel on a hub independent of other wheels, in a forward cab articulated tractor.

Another object is to disclose hydraulic steering cylinders to actuate steering and turning of the front cab, attached to articulating joint joining the rear motor section of a forward cab articulated tractor.

Another object is to disclose a hinged forward tilt front cab housing on a forward cab articulated tractor.

Another object is disclose a forward cab articulated tractor, with a shaft connected to a power motor in the rear or aft section C, of the articulated tractor and the shaft extending to a front power take off and a universal joint on the shaft and the universal joint located over the articulated joint.

Another object is to disclose a forward cab articulated tractor, with each power wheel mounted on its own hub and operated independently of other wheels.

BRIEF DESCRIPTION OF DRAWINGS OF FORWARD CAB ARTICULATED TRACTOR

Figure 12:
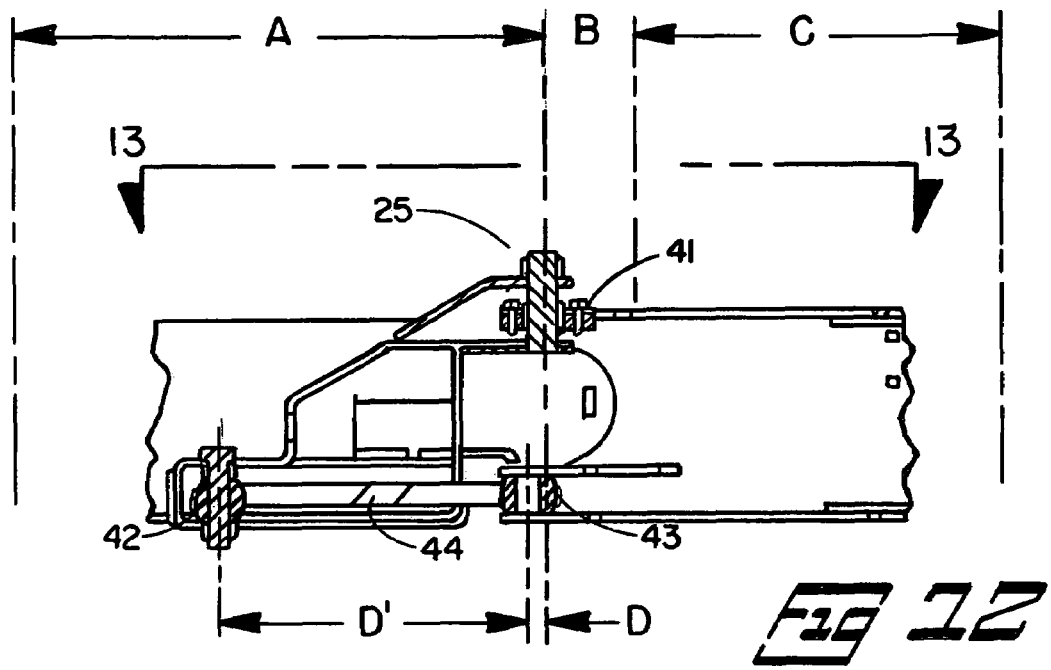
Figure 13:
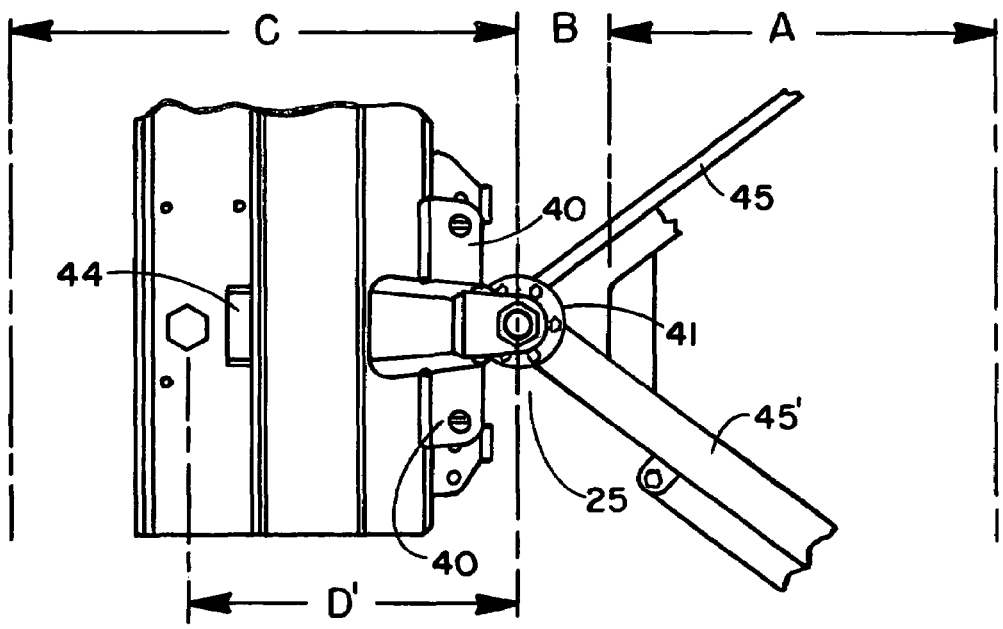

| FIG. NO. | DESCRIPTION |
|---|---|
| 1 | SCHEMATIC OF ARTICULATED TRACTOR |
| 2 | LEFT SIDE ELEVATION VIEW OF ARTICULATED TRACTOR |
| 3 | ISOMETRIC VIEW OF ARTICULATED TRACTOR IN TURNED POSITION. |
| 4 | PLAN VIEW OF ARTICULATED TRACTOR IN TURNED POSITION |
| 5 | PLAN VIEW OF ARTICULATED TRACTOR IN STRAIGHT LINE. |
| 6 | BOTTOM PLAN VIEW OF ARTICULATED TRACTOR FRAME IN LINE POSITION. |
| 7 | PLAN VIEW OF ARTICULATED TRACTOR FRAME |
| 8 | ELEVATION VIEW OF LEFT SIDE OF ARTICULATED TRACTOR CHASSIS FRAME |
| 9 | ELEVATION VIEW OF RIGHT SIDE OF ARTICULATED TRACTOR FRAME |
| 10 | ENLARGED PLAN VIEW OF IN LINE CONNECTION OF ARTICULATING JOINT. |
| 11 | ENLARGED PLAN VIEW OF ARTICULATING TRACTOR JOINT IN A TURNED POSITION |
| 12 | ISOLATED ENLARGED PLAN VIEW OF ARTICULATED TRACTOR JOINT SECTION |
| 13 | PLAN VIEW OF ASSEMBLY OF ARTICULATED JOINT FIG. 12 JOINING FRONT SECTION "A" AND REAR OR AFT SECTION "C" OF FORWARD CAB ARTICULATED TRACTOR. |
| 14 | ISOLATED TOP PLAN VIEW OF ARTICULATED JOINT JOINING FRONT SECTION"A" AND REAR OR AFT SECTION "C" OF FORWARD CAB ARTICULATED TRACTOR. IN A TURNED POSITION. |
| 15 | ISOLATED BOTTOM PLAN VIEW OF ARTICULATED JOINT JOINING FRONT SECTION "A" AND REAR OR AFT SECTION "C" OF FORWARD CAB ARTICULATED TRACTOR IN A TURNED POSITION. |

LEGEND DESCRIPTIONS

| LEGEND NO. | DESCRIPTION |
|---|---|
| 1, 1', 1", 1''' | TRACTOR WHEELS. |
| 2, 2', 2". 2''' | HYDRAULIC WHEEL MOTORS. |
| 3 | DRIVE SHAFT FRONT PTO. |
| 3' | DRIVE SHAFT REAR PTO |
| 4, 4' | WHEEL DISC BRAKES. |
| 5, 5', 5" | FLOW DIVIDERS ON A MANIFOLD |
| 6 | COOLER RADIATOR. |

-continued

| | DESCRIPTION |
|---|---|
| 7 | FILTER FOR HYDRAULIC FLUID.. |
| 8 | HYDRAULIC FLUID RESERVOIR. |
| 9 | PRIORITY CHECK VALVE TO STEERING CONTROL |
| 10 | HYDRAULIC PUMP. |
| 11 | AIR CLEANER. |
| 12 | ENGINE. |
| 13 | MUFFLER. |
| 14 | AUXILIARY HYDRAULIC PUMP |
| 15 | PRIORITY CONTROL VALVE |
| 16 | BATTERY. |
| 17 | FUEL TANK. |
| 18 | POWER TAKE OFF CLUTCH. |
| 19 | GEAR BOX. |
| 19' | REVERSE GEAR BOX |
| 20 | AUXILIARY PUMP (OPTIONAL) |
| 21 | CONTROL VALVES. |
| LEGEND | |
| 22 | STEERING CONTROL |
| 23 | STEERING WHEEL. |
| 24 | DRIVERS SEAT |
| 25 | ARTICULATING JOINT. |
| 26 | FRONT QUICK ATTACH SYSTEM. |
| 27 | FRONT POWER TAKE OFF . . .(PTO) |
| 28 | MODULATION VALVE FOR STEERING.. |
| 29 | LEFT SIDE PLAN VIEW OF ARTICULATED TRACTOR. |
| 29' | ISOMETRIC VIEW OF ARTICULATED TRACTOR IN LEFT TURN POSITION. |
| 29" | PLAN VIEW OF ARTICULATED TRACTOR IN LEFT TURN POSITION. |
| 29'" | PLAN VIEW OF ARTICULATED TRACTOR IN STRAIGHT LINE POSITION. |
| 30 | MAXIMUM TURN ARTICULATED JOINT. |
| 31 | FRONT OF FORWARD CAB OF ARTICULATED TRACTOR. |
| 32 | REAR OR AFT SECTION OF ARTICULATED TRACTOR. |
| 33 | PLAN VIEW OF IN LINE REAR SECTION OF ARTICULATED TRACTOR FRAME. |
| 34 | PLAN VIEW OF IN LINE FRONT SECTION A OF FRONT CAB ARTICULATED TRACTOR FRAME |
| 35 | SIDE ELEVATION VIEW OF "A" FRONT SECTION FRAME OF THE FORWARD CAB ARTICULATED TRACTOR. |
| 36 | SIDE ELEVATION VIEW OF REAR OR AFT SECTION C FRAME OF FORWARD CAB ARTICULATED TRACTOR |
| 37 | CYLINDER TO ACTUATE TURNING OF THE ARTICULATING JOINT. |
| 38 | CYLINDER TO ACTUATE TURNING OF THE ARTICULATING TRACTOR |
| 39 | UNIVERSAL JOINT. |
| 40 | CYLINDER ATTACHMENT PLATE.. |
| 41 | KING PIN BEARING. |
| 42 | FIRST AUXILIARY PIN BEARING. |
| 43 | SECOND AUXILIARY PIN BEARING. |
| 44 | ROD CONNECTOR |
| 45, 45' | REAR FRAME CONNECTOR ARM TO ARTICULATED JOINT |
| A. | FORWARD CAB SECTION OF ARTICULATED TRACTOR. |
| B | ARTICULATE JOINT FOR FORWARD CAB ARTICULATED TRACTOR. |
| C | REAR OR AFT SECTION OF FORWARD CAB ARTICULATED TRACTOR |
| D | OFFSET OF AUXILIARY PIN FROM FIRST KINGPIN. |
| D' | OFFSET OF SECOND AUXILIARY PIN FROM FIRST AUXILIARY PIN. |
| S | MAXIMUM TURNING ANGLE. |

DETAILED DESCRIPTION OF INVENTION

The forward cab articulated tractor of this invention as shown in FIGS. 2, 3, 4, 5 and legends 29 left side elevation view, 29' isometric view of articulated tractor, 29" plan view of articulated tractor 29'" plan view of articulated tractor in straight line. Referring to FIG. 1 shows hydraulic drive wheel motors 2, 2', 2" and 2'" at each wheel, 1, 1', 1", 1'". There is a brake 4, 4' at each front wheel.

Referring now to FIG. 1, showing the schematic of the hydraulic apparatus of this forward cab articulated tractor, flow dividers 5,5',5" on a manifold for hydraulic fluid directed to each hydraulic drive wheel motor 2, 2', 2" 2'", as directed by modulation valve 28 for steering. Engine 12, is an internal combustion motor connected to hydraulic pump 10, to supply fluid needed in the hydraulic system except for steering, which steering is actuated by an auxiliary hydraulic pump 14, then to priority valve 9, thence to steering control 22. Hydraulic fluid reservoir 8 for hydraulic fluid supply to auxiliary hydraulic pump 14, feeding into steering control 22, and into priority valve 15 and into control valve 21. Steering wheel 23, connected to steering control 22, and drivers seat 24 placed convenient to the steering wheel 23. The engine 12 is equipped with a cooler radiator 6, air cleaner 11, muffler 13 a fuel tank 17 and battery 16.

The hydraulic fluid filter 7, is in the line from hydraulic cooler radiator 6 to hydraulic fluid reservoir 8.

Drive shaft 3, 3' extends the length of the articulated tractor, with a universal joint 39 positioned on drive shaft 3 and the universal joint 39 above the juncture of the articulated joint 25, to allow turning of the articulated tractor. The drive shaft 3 is for mounting of front power take-off 27, with front quick attach system 26 at the front of section A of the articulated tractor 45. Drive shaft 3' is connected to reverse gear box 19' connected to power take off clutch 18 for rear power take off. As an option, a motor auxiliary pump 20 connects to gear box 19. Power take offs are not shown on the drawings, as these are standard and well known in the industry, and the power take-offs fit on front spline end of shaft 3 and rear spline end of shaft 3'.

Referring to FIG. 1, legend A indicates the forward cab, which includes the controls of the articulated tractor. Legend B indicates the articulating joint 25, connecting the front cab section of the articulated tractor 29 to the rear or aft section C, which contains the power source engine and manifold of the articulated tractor.

Figure 2:
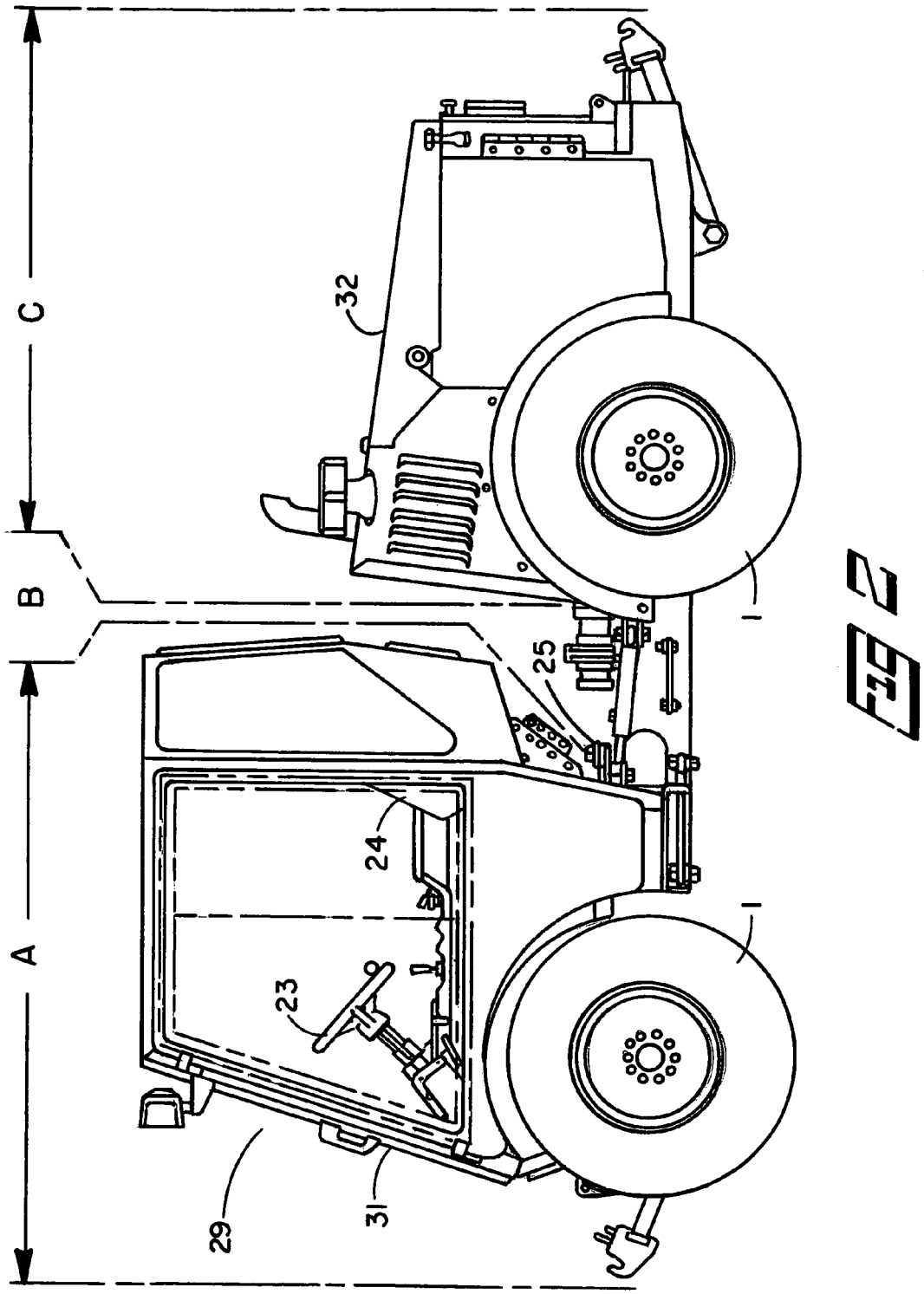
Figure 3:
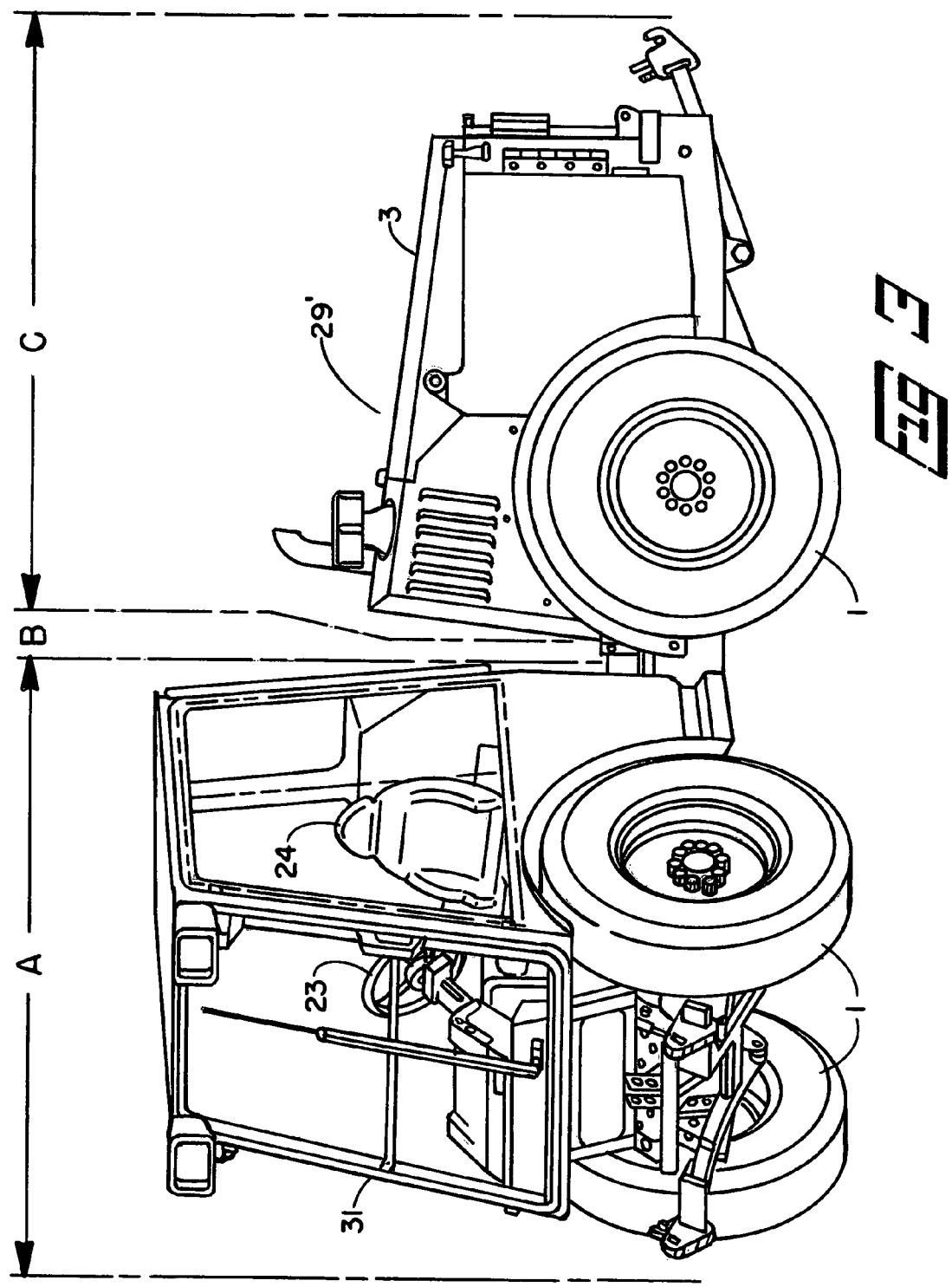
Figure 4:
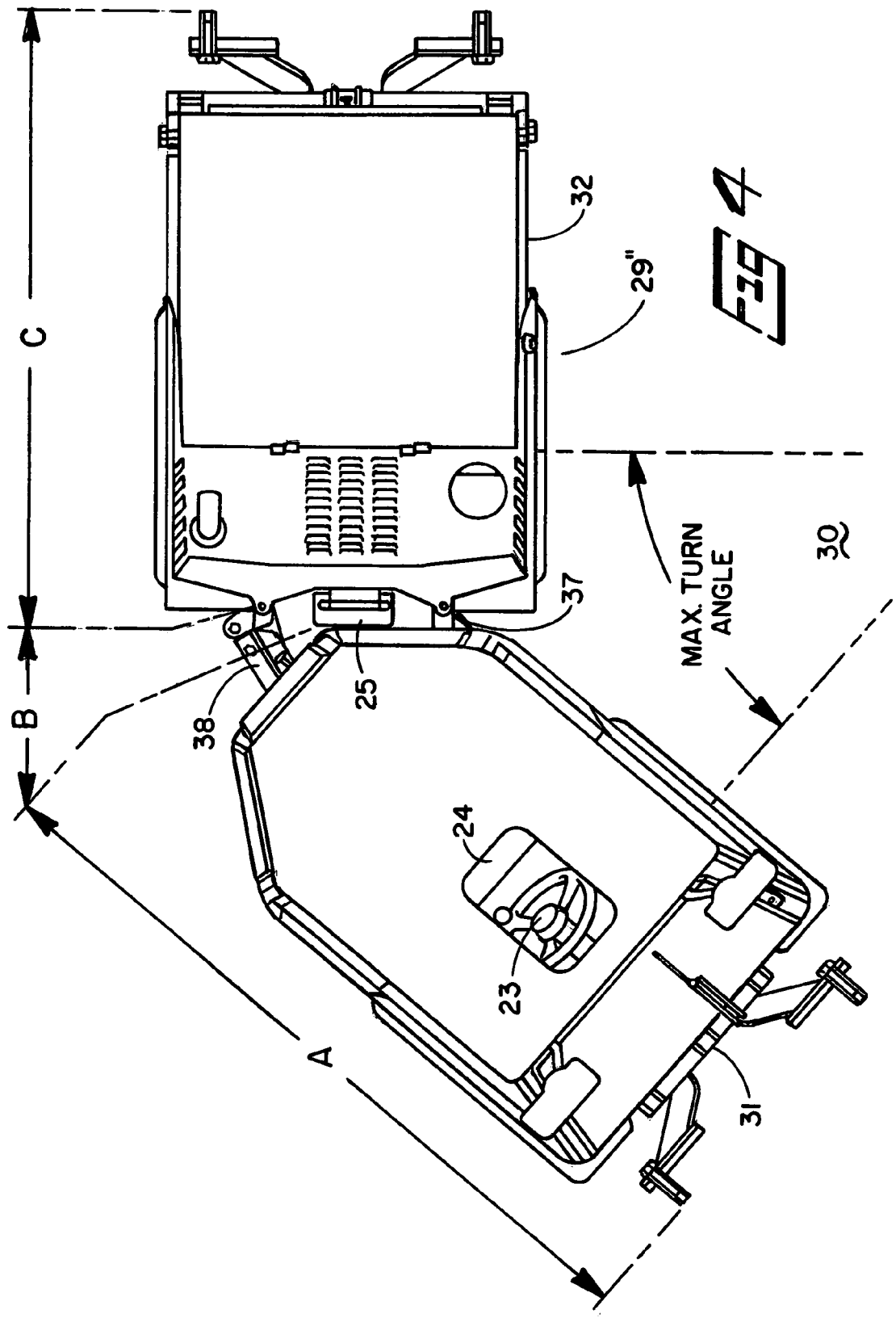

FIG. 2 is left side elevation view of the articulated tractor, and FIG. 3 is an elevation view of articulated tractor in turned position 29'. FIG. 4 is plan view of articulated tractor 29"

components A, B, and C, in a turned position, showing steering wheel 23, drivers seat 24, steering cylinders 37 and 38 to actuate turning of the articulating joint 25.

Figure 5:
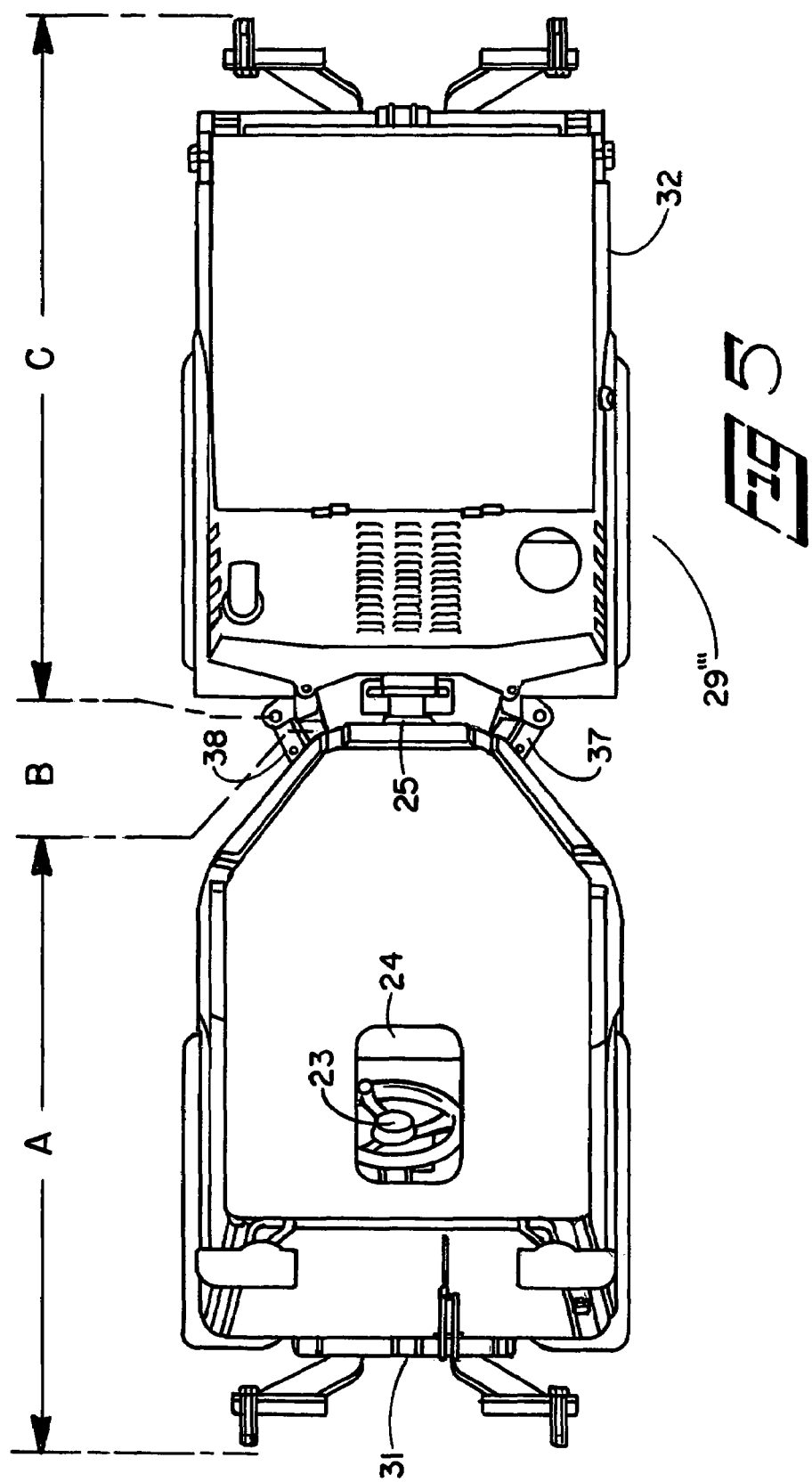
Figure 6:
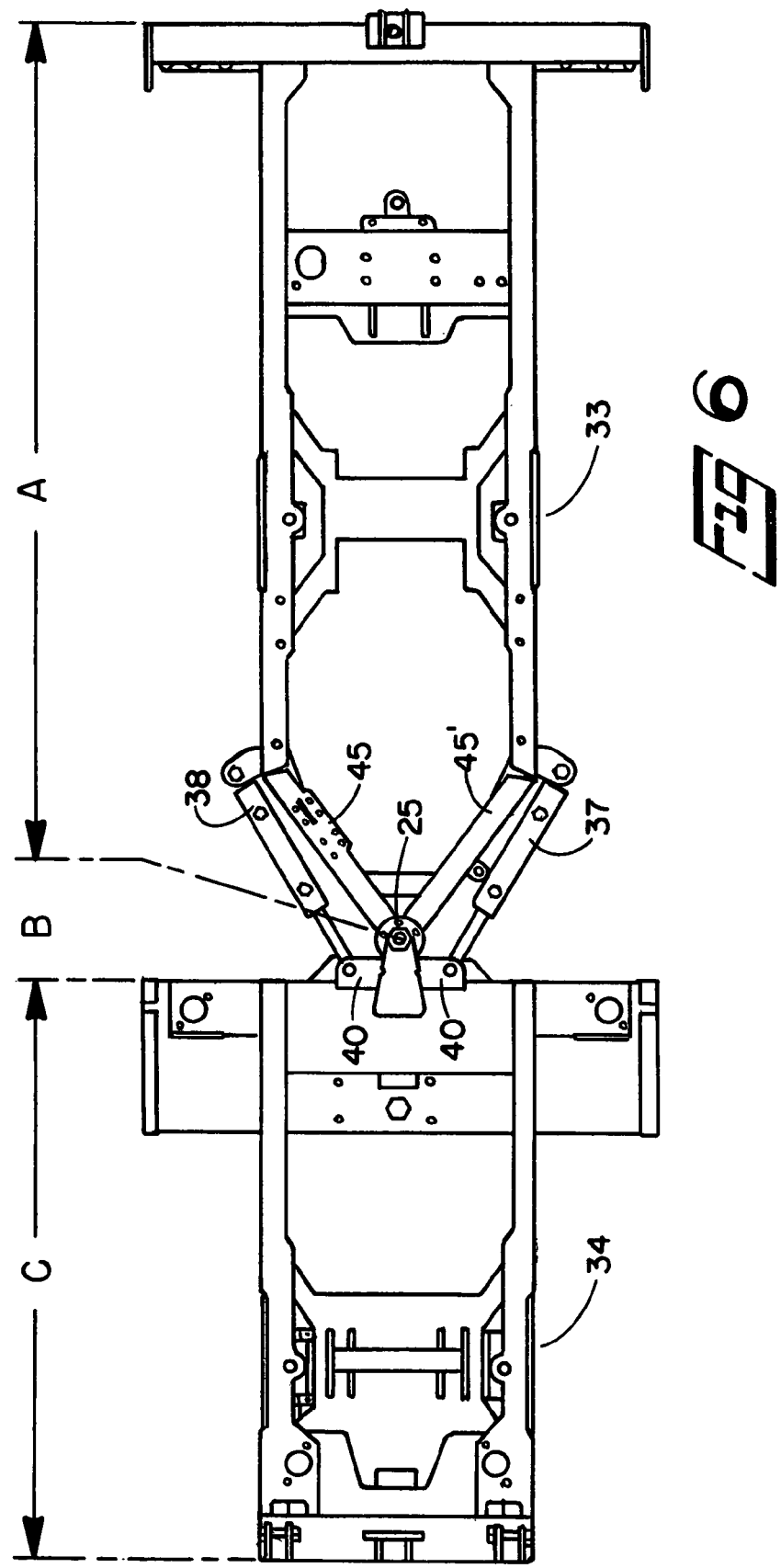

FIG. 5 is a plan view of the articulated tractor components A, B, and C in a straight line 29''' steering cylinders 37 and 38 attached to rear frame of front cab and articulating joint 25.

FIGS. 5, 6, 8 and 9 showing plan view of forward cab articulated tractor frame in straight line position showing sections A, B, and C, of the articulated tractor, and steering cylinders 37, 38 one end of each cylinder connected to front frame connector arms 45, 45' at the rear of front segment of frame 34 of section A and the opposite end of each cylinder 37, 38 connected adjacent to and straddling articulating joint 25 mount.

Figure 7:
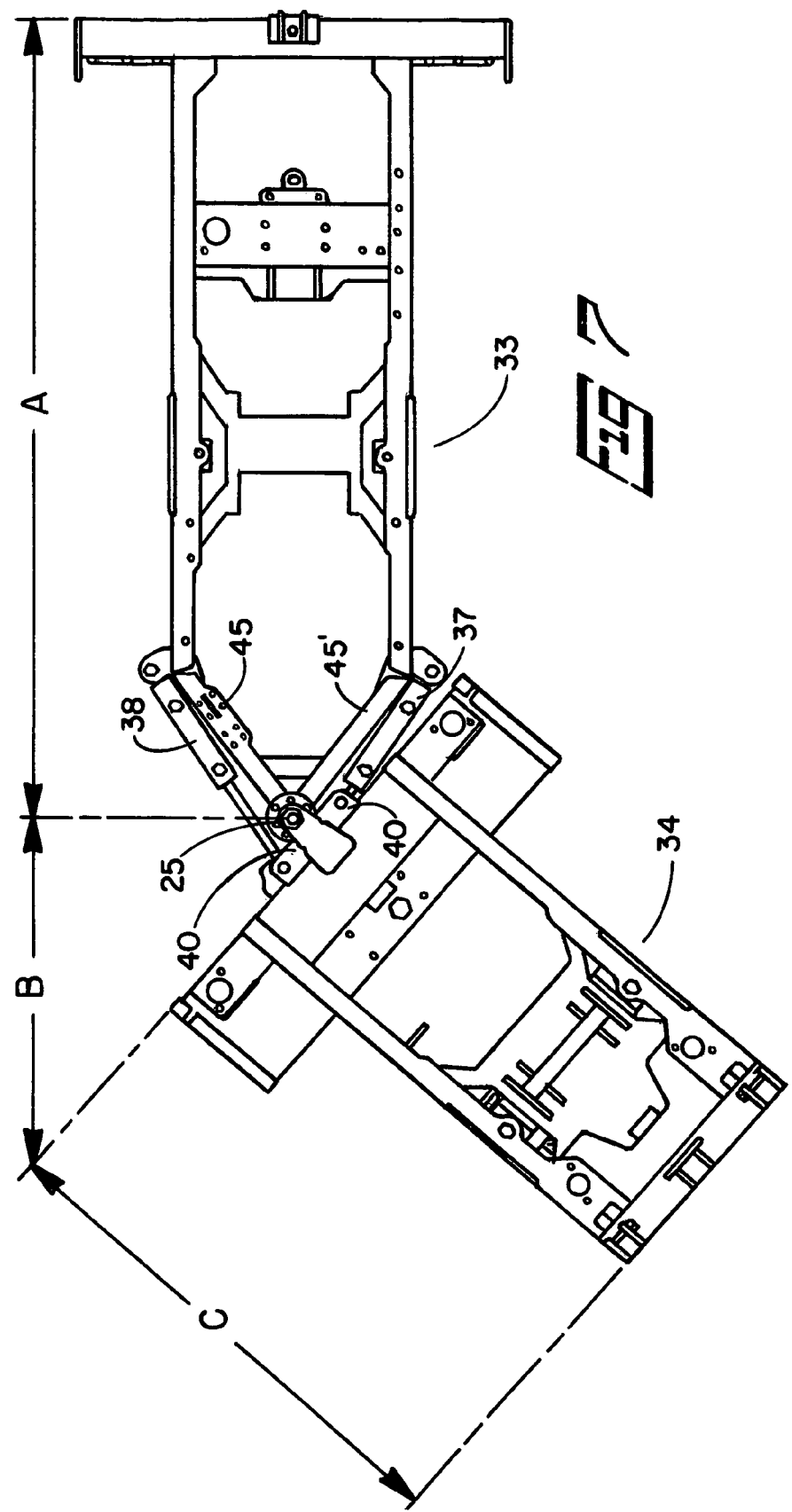

FIG. 7 is a plan view of articulated tractor frame, front and rear segments 34 and 33 respectively, in a turned position actuated by steering cylinders 37 and 38.

FIGS. 8 and 9 are side elevation views of forward cab articulated tractor 29 segments A, B, and C. FIG. 8 showing elevation view of right side of articulated tractor frame and 35 is side elevation view of front section A of frame of the articulated tractor, and 36, side elevation view of rear aft section C of frame of the articulated tractor 29. FIG. 9 is elevation view of left side of articulated tractor frame, showing segments A, B, and C, and articulating joint 25 is shown in each of FIGS. 8 and 9.

Figure 10:
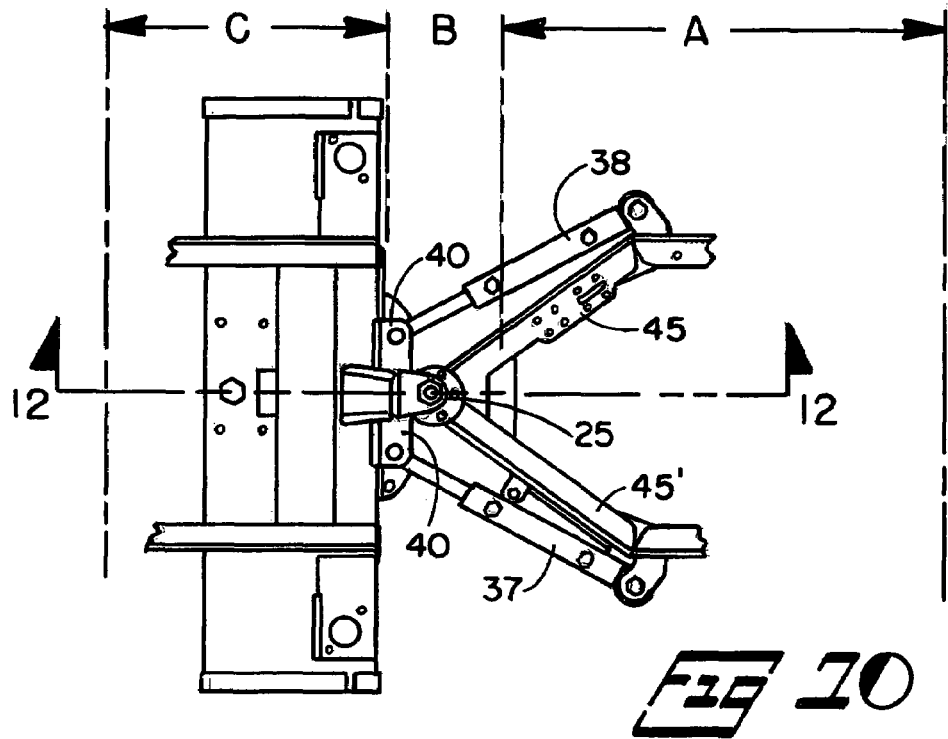

FIG. 10 shows the bottom plan view of the connection of forward section A of articulated tractor 29, connected to articulating joint 25, and cylinders 37 and 38 to actuate turning of the articulating joint 25, connect to the rear of the front section A, and to the front of the rear, or aft section C, and the front of the rear or aft section C connects to the articulating joint 25

Figure 11:
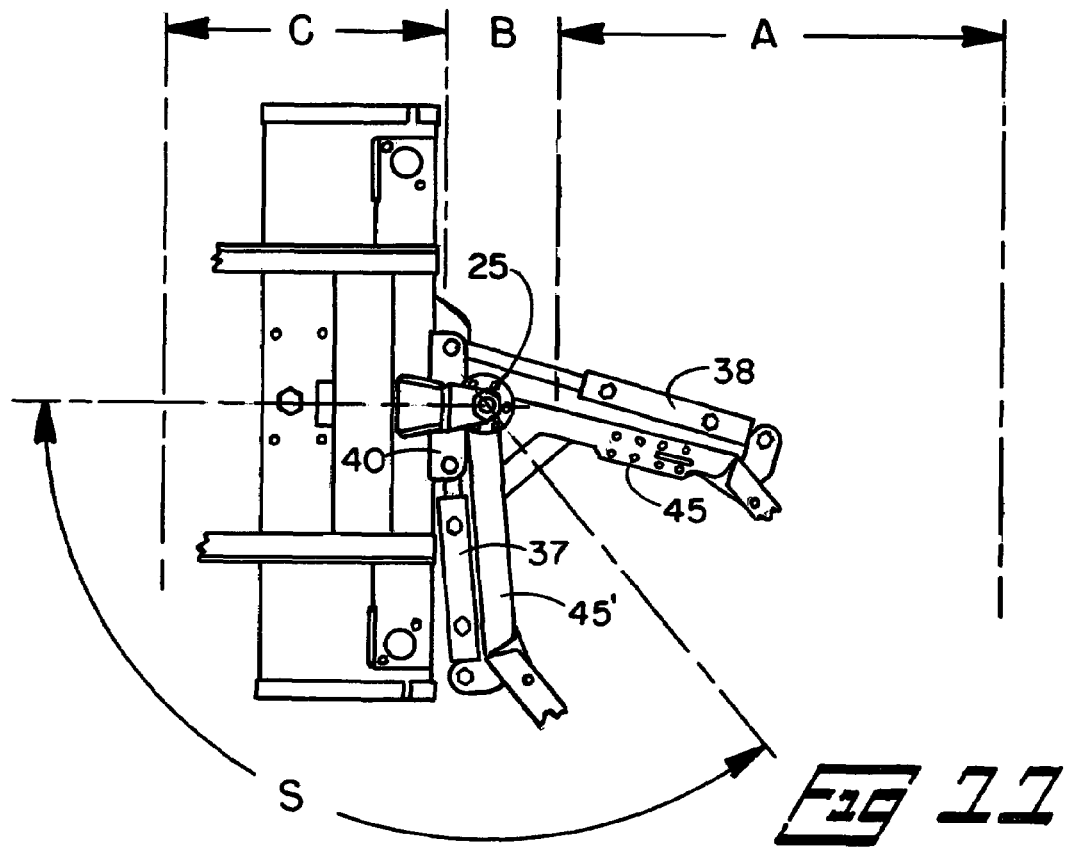

FIG. 11 is an enlarged plan view of forward cab articulated tractor frame in a turned position showing the maximum turning angle S of the articulating joint 25.

FIG. 12 is an elevation view of the articulating joint 25, showing king pin bearing 41, and a first auxiliary pin bearing 42, a second auxiliary pin bearing 43, and a rod connector 44 joining auxiliary pin bearings 42 and 43.

In FIG. 4 is shown the maximum articulated joint turn angle 30, and front 31 of forward cab articulated tractor and rear section 32 of articulated tractor 29. Legends 31 and 32 are also shown in FIG. 2.

The articulating joint of this invention includes connector rod 44 (FIG. 12) attaching first auxiliary pin bearing 42, to second auxiliary pin bearing 43, and legend D is the horizontal offset distance of second auxiliary pin bearing 43, from the vertical of king pin bearing 41, and D' is the horizontal distance of bearing of first auxiliary pin bearing 42, from second auxiliary pin bearing 43.

Figure 14:
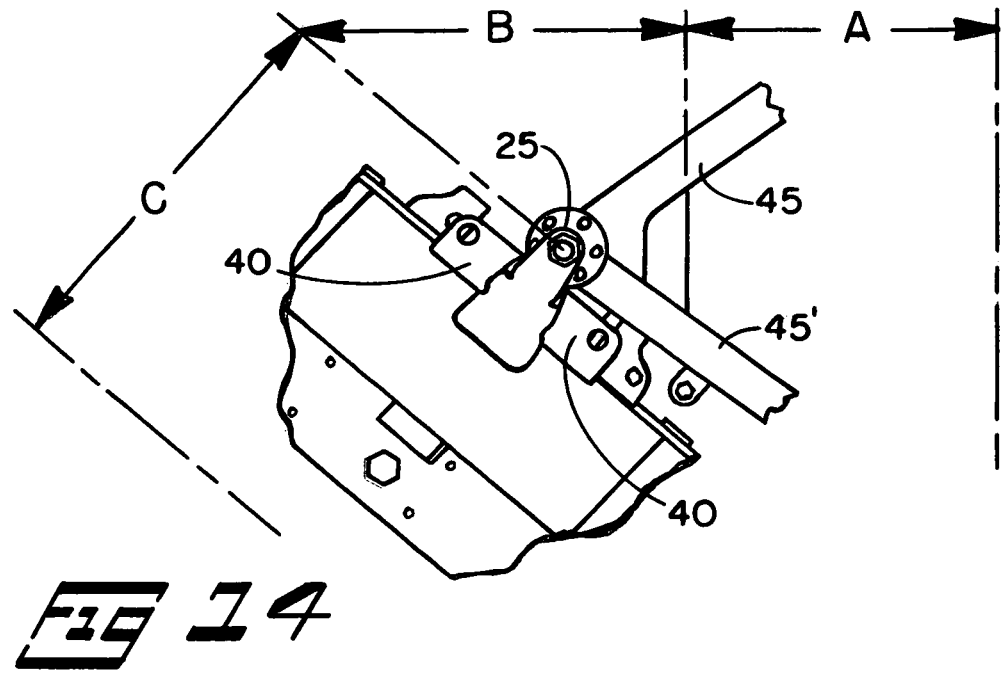
Figure 15:
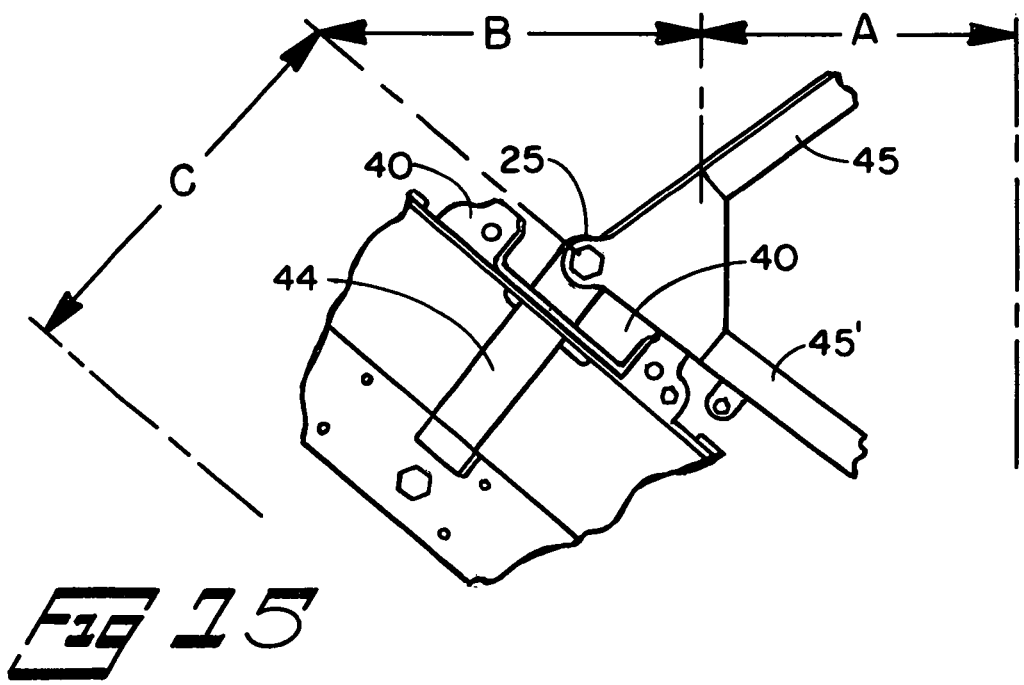

Cylinders 37 and 38 actuate turning of the articulating joint 25, are attached to a cylinder attachment plate 40 with the cylinders attached to the plate 40, cylinder 37 attached to one side of the king pin bearing 41, of the articulated joint 25, and cylinder 38 attached on the other side of the cylinder attachment plate 40, the cylinders 37 and 38 thus straddle the king pin bearing 41. (See FIGS. 6, 7, 10, 11, 13, 14, and 15). The steering wheel 23 actuates cylinders 37 and 38 for turning of the articulated tractor. FIG. 14 is isolated top plan view of articulated joint joining front section "A" and rear or aft section "C" of articulated tractor in a turned position. FIG. 15 is isolated bottom plan view of articulated joint joining front section "A" and rear aft section "C" of articulated tractor in a turned position. Legend 32 is rear section of forward cab articulated tractor, (see FIGS. 2, 3, and 4.)

Legend 30 shows the maximum turn angle (see FIG. 4). Legend 31 is the front of the forward cab "A" as shown in FIGS. 2, 3, and 4

In all of the above discussion "ARTICULATED TRACTOR" is the same as "FORWARD CAB ARTICULATED TRACTOR" as these terms are synonymous in this disclosure.

Having described my invention I claim:

1. A forward cab articulated tractor wherein the improvement consists of:
   (a) a forward cab section including an operator space and controls for said forward cab articulated tractor,
   (b) said forward cab section attached to an articulating hinge,
   (c) a rear section pivotally attached to said articulating hinge and located aft of said forward cab section,
   (d) said rear section including a power source comprising an internal combustion engine,
   (e) said internal combustion engine connected to a hydraulic fluid pump located in said rear section of said forward cab articulated tractor,
   (f) hydraulically driven front and rear drive wheels disposed on said forward cab section and said rear section, respectively, each of said front drive wheels and said rear drive wheels having an adjacent hydraulic drive wheel motor associated therewith,
   (g) said hydraulic fluid pump providing hydraulic fluid into a manifold on said rear section, said manifold having flow dividers directing said hydraulic fluid to said hydraulically driven front and rear drive wheels via hydraulic fluid lines having at least one control valve connected thereto,
   (h) hydraulic steering cylinders attached between said forward cab section and said rear section for actuating turning of said articulating hinge, said hydraulic steering cylinders receiving said hydraulic fluid directed from said flow dividers on said manifold via said hydraulic fluid lines, and
   (i) hydraulic drive wheel disc brakes on each of said front drive wheels adjacent said front hydraulic drive wheel motors, said hydraulic drive wheel disc brakes connected via said hydraulic fluid lines to said manifold to provide braking function to said forward cab articulated tractor.

* * * * *